Figure 1:
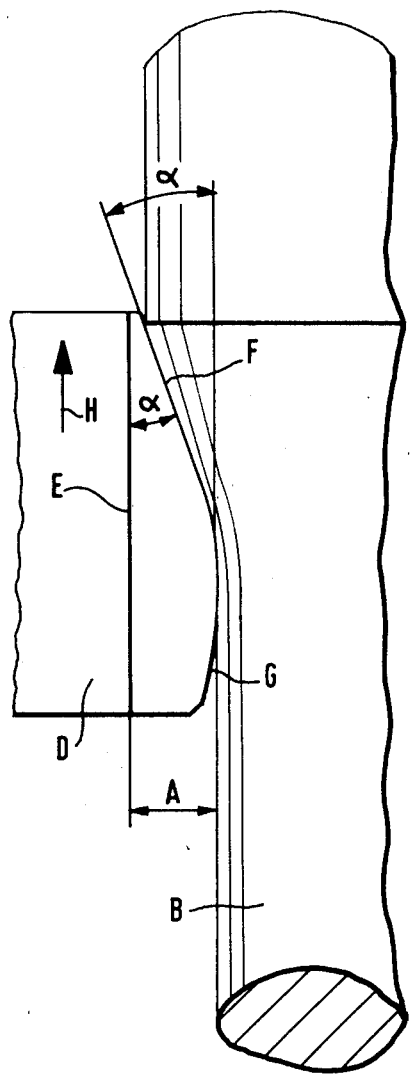

United States Patent [19]
Berstein et al.

[11] 4,371,296
[45] Feb. 1, 1983

[54] CUTTING TOOL FOR INTERNAL AND EXTERNAL TURNING OPERATIONS

[75] Inventors: Garri Berstein, Erkelenz; Walter Riedel, Wegberg, both of Fed. Rep. of Germany

[73] Assignee: Wilhelm Hegenscheidt Gesellschaft mbH, Erkelenz, Fed. Rep. of Germany

[21] Appl. No.: 196,251

[22] Filed: Oct. 10, 1980

[30] Foreign Application Priority Data

Oct. 11, 1979 [DE] Fed. Rep. of Germany ....... 2941203

[51] Int. Cl.³ .............................................. B26D 1/00
[52] U.S. Cl. ......................................... 407/115; 82/20
[58] Field of Search ............... 407/113, 114, 115, 116, 407/118, 120; 82/20, 1 C

[56] References Cited

U.S. PATENT DOCUMENTS

| 2,936,679 | 5/1960 | Thuerwachter | 407/120 |
| 3,052,951 | 9/1962 | Kubota | 407/120 |
| 3,744,358 | 7/1973 | Lindemann | 82/20 |
| 3,815,194 | 6/1974 | Goeke | 82/20 |
| 3,911,543 | 10/1975 | Sorice | 407/113 |
| 4,111,589 | 9/1978 | Goeke | 407/114 |
| 4,214,847 | 7/1980 | Kraemer | 407/114 |
| 4,278,369 | 7/1981 | Jakobs et al. | 407/114 |

FOREIGN PATENT DOCUMENTS

| 2148318 | 9/1971 | Fed. Rep. of Germany . |
| 7622259 | 7/1976 | Fed. Rep. of Germany . |
| 2734095 | 2/1978 | Fed. Rep. of Germany ...... 407/114 |
| 2719010 | 11/1978 | Fed. Rep. of Germany ...... 407/113 |
| 1182432 | 1/1959 | France . |
| 2059824 | 4/1981 | United Kingdom ................ 407/116 |
| 545415 | 3/1977 | U.S.S.R. ................................ 407/116 |

*Primary Examiner*—Leonidas Vlachos
*Attorney, Agent, or Firm*—W. G. Fasse; D. H. Kane, Jr.

[57] ABSTRACT

A cutting tool for internal and external turning has a body with straight main cutting edge, a curved auxiliary cutting edge, and a chip guiding shoulder extending in parallel to the feed advance direction of the tool. The main cutting edge forms a tangent to the curved auxiliary cutting edge. Further, the main cutting edge encloses an angle of 3° to 9° with the direction of the chip guiding shoulder an normally with the feed advance direction. This construction makes the tool substantially independent of tool positioning errors whereby the cutting quality is increased.

2 Claims, 2 Drawing Figures

CUTTING TOOL FOR INTERNAL AND EXTERNAL TURNING OPERATIONS

CROSS REFERENCE TO RELATED APPLICATIONS

The present application is based on the corresponding German Patent Publication No. P 2,941,203, filed in the Federal Republic of Germany on Oct. 11, 1979. The priority of said German filing date is hereby expressly claimed.

BACKGROUND OF THE INVENTION

The present invention relates to a cutting tool for internal and external turning operations. More specifically, the invention relates to a turning tool having a main cutting edge and an auxiliary cutting edge for an internal and external turning in the manner of a peeling operation, whereby the cutting edges cooperate with a chip guiding shoulder. Cutting tools of this type are disclosed in German Pat. No. 2,148,318. The prior art cutting tool has the disadvantage that it is extremely sensitive relative to positioning errors. Even a slight tilting about a vertical axis causes a penetration of the work piece by the auxiliary cutting edge, thereby destroying the work piece or causing the auxiliary cutting edge to be lifted off the surface to be machined, whereby a variation in the chip breaking is caused which in turn results in an unpermissible increase in the roughness of the machined surface. Both deviations from the desired condition have resulted in unsatisfactory surface machining.

OBJECTS OF THE INVENTION

In view of the above it is the aim of the invention to achieve the following objects singly or in combination:

to construct a cutting or turning tool of the type mentioned which is substantially less sensitive or even nonsensitive to positional errors while simultaneously assuring a high machining rate or metal removing rate combined with a good surface characteristic such as the peak to valley characteristic or depth of the machined surface;

to construct a turning tool so that it will have, simultaneously with the above qualities, a good chip breaking characteristic;

to make sure that even if the tool is not positioned correctly 100%, the auxiliary cutting edge does not penetrate into the work piece; and to make sure that the tool will provide a machined surface of uniform quality throughout the machining operation even if there should be a tool positioning error.

SUMMARY OF THE INVENTION

According to the invention there is provided a cutting tool for internal and external turning operations comprising a tool body with a main cutting edge which encloses an angle of 3° to 9° with the feed advance direction and with the longitudinal extension of the chip guiding shoulder. Further, the main cutting edge forms a tangent relative to a curved auxiliary cutting edge. Due to the curved shape of the auxiliary cutting edge it is prevented that the auxiliary cutting edge can penetrate into a work piece when the tool is subject to a positioning error. Further, since the main cutting edge merges tangentially into the curved auxiliary cutting edge, there is no sharp transition between the two cutting edges which could cause unpermissible roughness in the machined surface if there should be an error in the positioning of the tool. The combination of features according to the invention makes sure that even if positioning errors of the tool are present, the machining result is a machined surface of a uniform surface quality. Further, the combination assures that at all times a sufficient cutting depth is machined off while simultaneously assuring a satisfactory chip breaking.

According to a further embodiment of the invention the maximum spacing of the chip guiding shoulder from the cutting edges is within the range of 1.3 to 2.0 mm. Practical tests have shown that for this depth of the chip guiding shoulder the breaking of the chips is optimized.

BRIEF FIGURE DESCRIPTION

Figure 2:
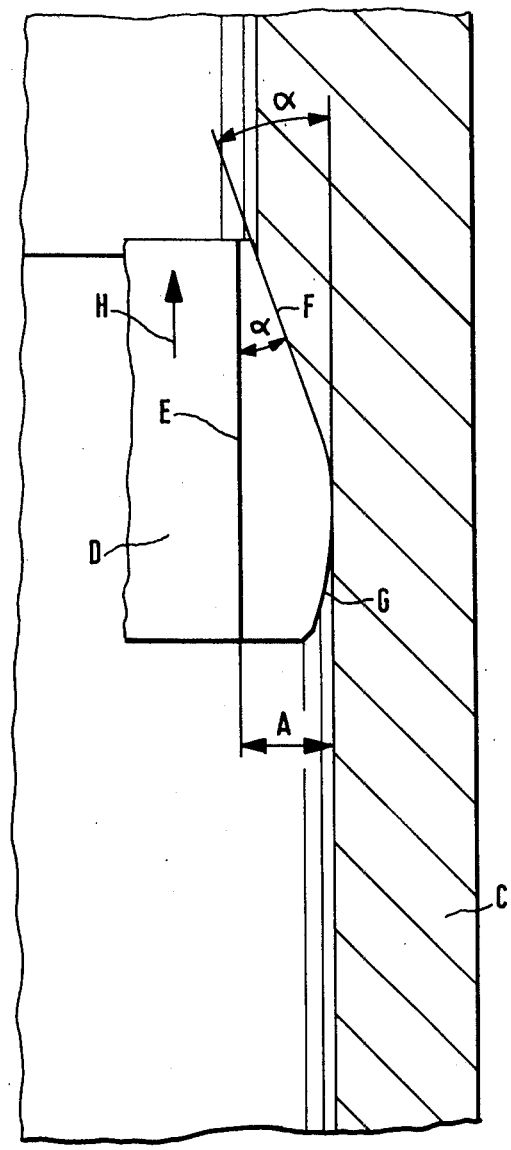

In order that the invention may be clearly understood, it will now be described, by way of example, with reference to the accompanying drawings, wherein:

FIG. 1 is a schematic illustration of the tool according to the invention shown while machining the external surface of a shaft; and FIG. 2 is a sectional view through a tubular work piece, the inner surface of which is being machined by a tool according to the invention.

DETAILED DESCRIPTION OF PREFERRED EXAMPLE EMBODIMENTS AND OF THE BEST MODE OF THE INVENTION

The same reference characters are used in FIGS. 1 and 2 for the same components. The cutting tool according to the invention comprises a body D which during the machining operation of the work piece such as the shaft B or the cylinder C is advanced in the direction of the arrow H. While the tool is advanced in the direction H, the work piece B or C is rotated by conventional means, for example, on a lathe. The tool machines the outer or inner surface of the work piece by means of a substantially straight main cutting edge F and by means of a curved auxiliary cutting edge G. The main cutting edge F merges tangentially into the curved cutting edge G. The main cutting edge F includes an angle $\alpha$ with the feed advance direction H. The angle $\alpha$ is within the range of 3° to 9°.

As long as the tool body is in its normal position this angle is maintained.

The angle $\alpha$ is also present between the straight cutting edge F and a chip guiding or deflecting shoulder E. As long as the tool is in its properly oriented position, the shoulder E extends in parallel to the feed advance direction H. In that instance the angle $\alpha$ between the edge F and the shoulder E is the same as the angle $\alpha$ between the edge F and the feed advance direction H.

The chip guiding or deflecting edge E has a maximum depth A from the curved cutting edge G. This depth should be within the range of 1.3 mm to 2.0 mm for assuring a proper chip breaking in all possible positions of the tool body D.

It has been found, that, surprisingly, with this type of arrangement of the angle $\alpha$ a change of the tool position relative to the feed advance direction H does not influence the chip breaking nor the surface quality and the machining precision of the machined surface of the work piece B or C. It is particularly surprising that an increase in the angle between the cutting edge F and the feed advance direction H does not result in wasted work pieces. Further, this angle $\alpha$ in combination with the depth A and with the direction of the chip guide shoulder E results in a highly desirable breaking of the chips which in turn improves the machining quality.

Although the invention has been described with reference to specific example embodiments, it will be appreciated, that it is intended, to cover all modifications and equivalents within the scope of the appended claims.

What is claimed is:

1. A cutting tool for internal and external turning operations, comprising a tool body, a substantially straight main cutting edge on said tool body, a curved auxiliary cutting edge on said tool body adjacent said main cutting edge in such position that the main cutting edge forms a tangent to the curved auxiliary cutting edge, and chip guiding shoulder means on said tool body operatively arranged to enclose an angle with said main cutting edge, said angle being within the range of 3° to 9°, and wherein said chip guiding shoulder means extend in parallel to the feed advance direction of the tool, whereby said angle within the range of 3° to 9° is also enclosed between said main cutting edge and the feed advance direction.

2. The cutting tool of claim 1, wherein said chip guide means have a maximum depth relative to said curved auxiliary cutting edge within the range of 1.3 to 2.0 mm.

* * * * *